(12) United States Patent
Hirao

(10) Patent No.: US 9,747,211 B2
(45) Date of Patent: Aug. 29, 2017

(54) CACHE MEMORY, CACHE MEMORY CONTROL UNIT, AND METHOD OF CONTROLLING THE CACHE MEMORY

(71) Applicant: SONY CORPORATION, Tokyo (JP)

(72) Inventor: Taichi Hirao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/090,838

(22) Filed: Apr. 5, 2016

(65) Prior Publication Data
US 2016/0217075 A1  Jul. 28, 2016

Related U.S. Application Data

(63) Continuation of application No. 14/205,418, filed on Mar. 12, 2014, now Pat. No. 9,336,148.

(30) Foreign Application Priority Data

Mar. 25, 2013  (JP) ................. 2013-061360

(51) Int. Cl.
| | |
|---|---|
| *G06F 12/0831* | (2016.01) |
| *G06F 12/0864* | (2016.01) |
| *G06F 12/084* | (2016.01) |
| *G06F 12/0855* | (2016.01) |
| *G06F 12/128* | (2016.01) |

(52) U.S. Cl.
CPC ........ *G06F 12/0833* (2013.01); *G06F 12/084* (2013.01); *G06F 12/0859* (2013.01); *G06F 12/0864* (2013.01); *G06F 12/128* (2013.01); *G06F 2212/314* (2013.01); *G06F 2212/621* (2013.01); *G06F 2212/69* (2013.01)

(58) Field of Classification Search
CPC ............... G06F 12/0833; G06F 12/084; G06F 12/0859; G06F 12/0864; G06F 12/128; G06F 2212/621; G06F 2212/69
See application file for complete search history.

(56) References Cited

U.S. PATENT DOCUMENTS

2010/0030966 A1* 2/2010 Hirao ................. G06F 12/0859
711/122

* cited by examiner

*Primary Examiner* — Eric S Cardwell
(74) *Attorney, Agent, or Firm* — Chip Law Group

(57) ABSTRACT

A cache memory includes: a tag storage section in which one of a plurality of indexes, each index containing a plurality of tag addresses and one suspension-indicating section, is looked up by a first address portion of an accessed address; a data storage section; a tag control section configured to, when the suspension-indicating section contained in the looked-up index indicates suspension, allow access relevant to the accessed address to wait, and when the suspension-indicating section contained in the looked-up index indicates non-suspension, compare a second address portion different from the first address portion of the accessed address to each of the plurality of tag addresses contained in the looked-up index, and detects a tag address matched with the second address portion; and a data control section.

15 Claims, 22 Drawing Sheets

READ COMMAND: READ REQUEST FROM PROCESSOR TO SECONDARY CACHE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | RESERVE WAY, AND FILL | 1 | 0 | 1 | 0 | AFTER FILL, READ |
| 0 | MIS-MATCH | 0 | 1 | | | | | | | (NOT OCCUR) |
| 0 | MIS-MATCH | 1 | 0 | MISS | RESERVE WAY, AND FILL | 1 | 0 | 1 | 0 | AFTER FILL, READ |
| 0 | MIS-MATCH | 1 | 1 | MISS | WRITE-BACK, RESERVE WAY, AND FILL | 1 | 1 | 1 | 0 | AFTER FILL, READ |
| 0 | MATCH | 0 | 0 | MISS | RESERVE WAY, AND FILL | 1 | 0 | 1 | 0 | AFTER FILL, READ |
| 0 | MATCH | 0 | 1 | | | | | | | (NOT OCCUR) |
| 0 | MATCH | 1 | 0 | HIT | READ | 0 | 0 | 1 | 0 | |
| 0 | MATCH | 1 | 1 | HIT | READ (NO WRITE-BACK) | 0 | 0 | 1 | 1 | |
| not0 | * | * | * | SUSPEN-SION | WAIT UNTIL OS=0 | NO CHANGE | | | | |

FIG. 6

WRITE COMMAND:WRITE REQUEST FROM PROCESSOR TO SECONDARY CACHE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | RESERVE WAY, AND FILL | 1 | 0 | 1 | 0 | AFTER FILL, WRITE |
| 0 | MIS-MATCH | 0 | 1 | | | | | | | (NOT OCCUR) |
| 0 | MIS-MATCH | 1 | 0 | MISS | RESERVE WAY, AND FILL | 1 | 0 | 1 | 0 | AFTER FILL, WRITE |
| 0 | MIS-MATCH | 1 | 1 | MISS | WRITE-BACK, RESERVE WAY, AND FILL | 1 | 1 | 1 | 0 | AFTER FILL, WRITE |
| 0 | MATCH | 0 | 0 | MISS | RESERVE WAY, AND FILL | 1 | 0 | 1 | 0 | AFTER FILL, WRITE |
| 0 | MATCH | 0 | 1 | | | | | | | (NOT OCCUR) |
| 0 | MATCH | 1 | 0 | HIT | WRITE | 0 | 0 | 1 | 1 | |
| 0 | MATCH | 1 | 1 | HIT | WRITE (NO WRITE-BACK) | 0 | 0 | 1 | 1 | |
| not0 | * | * | * | SUSPEN-SION | WAIT UNTIL OS=0 | NO CHANGE | | | | |

FIG. 7

FILL COMMAND

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | RESERVE WAY, AND FILL | 1 | 0 | 1 | 0 | |
| 0 | MIS-MATCH | 0 | 1 | | | | | | | (NOT OCCUR) |
| 0 | MIS-MATCH | 1 | 0 | MISS | RESERVE WAY, AND FILL | 1 | 0 | 1 | 0 | |
| 0 | MIS-MATCH | 1 | 1 | MISS | WRITE-BACK, RESERVE WAY, AND FILL | 1 | 1 | 1 | 0 | |
| 0 | MATCH | 0 | 0 | MISS | RESERVE WAY, AND FILL | 1 | 0 | 1 | 0 | |
| 0 | MATCH | 0 | 1 | | | | | | | (NOT OCCUR) |
| 0 | MATCH | 1 | 0 | HIT | PERFORM NOTHING | NO CHANGE | | | | |
| 0 | MATCH | 1 | 1 | HIT | PERFORM NOTHING | NO CHANGE | | | | |
| not0 | * | * | * | SUSPEN-SION | WAIT UNTIL OS=0 | NO CHANGE | | | | |

· IN THE CASE OF MISS:A CACHE LINE IS ALLOCATED, AND DATA IS READ FROM A MAIN MEMORY AND STORED IN THE CACHE LINE.
· IN THE CASE OF HIT:NOTHING IS PERFORMED.

FIG. 8

FLUSH COMMAND ADDRESS TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| o | MIS-MATCH | 0 | 0 | MISS | PERFORM NOTHING | NO CHANGE | | | | |
| o | MIS-MATCH | 0 | 1 | | | | | | | (NOT OCCUR) |
| o | MIS-MATCH | 1 | 0 | MISS | PERFORM NOTHING | NO CHANGE | | | | |
| o | MIS-MATCH | 1 | 1 | MISS | PERFORM NOTHING | NO CHANGE | | | | |
| o | MATCH | 0 | 0 | MISS | PERFORM NOTHING | NO CHANGE | | | | |
| o | MATCH | 0 | 1 | | | | | | | (NOT OCCUR) |
| o | MATCH | 1 | 0 | HIT | PERFORM NOTHING | NO CHANGE | | | | |
| o | MATCH | 1 | 1 | HIT | WRITE-BACK | o | 1 | 1 | 0 | |
| not0 | * | * | * | SUSPEN-SION | WAIT UNTIL OS=0 | NO CHANGE | | | | |

· IN THE CASE OF MISS:NOTHING IS PERFORMED.
· IN THE CASE OF HIT:DATA IS WRITTEN BACK TO A MAIN MEMORY ONLY WHEN D IS 1. IN OTHER CASES, NOTHING IS PERFORMED.

FIG. 9

FLUSH COMMAND INDEX TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | * | 0 | 0 | LINE IS INVALID | PERFORM NOTHING | NO CHANGE | | | | |
| 0 | * | 0 | 1 | | | | | | | (NOT OCCUR) |
| 0 | * | 1 | 0 | LINE IS INVALID | PERFORM NOTHING | NO CHANGE | | | | |
| 0 | * | 1 | 1 | LINE IS VALID, DIRTY | WRITE-BACK | 0 | 1 | 1 | 0 | |
| not0 | * | * | * | SUSPEN-SION | WAIT UNTIL OS=0 | NO CHANGE | | | | |

A CACHE LINE IS SPECIFIED WITH AN INDEX VALUE AND A WAY VALUE, AND ONLY WHEN BOTH V AND D ARE 1, DATA IS WRITTEN BACK TO A MAIN MEMORY. IN OTHER CASES, NOTHING IS PERFORMED.

FIG. 10

INVALIDATE COMMAND ADDRESS TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | PERFORM NOTHING | NO CHANGE | | | | |
| 0 | MIS-MATCH | 0 | 1 | | | | | | | (NOT OCCUR) |
| 0 | MIS-MATCH | 1 | 0 | MISS | PERFORM NOTHING | NO CHANGE | | | | |
| 0 | MIS-MATCH | 1 | 1 | MISS | PERFORM NOTHING | NO CHANGE | | | | |
| 0 | MATCH | 0 | 0 | MISS | PERFORM NOTHING | NO CHANGE | | | | |
| 0 | MATCH | 0 | 1 | | | | | | | (NOT OCCUR) |
| 0 | MATCH | 1 | 0 | HIT | INVALIDATION | 0 | 0 | 0 | 0 | |
| 0 | MATCH | 1 | 1 | HIT | INVALIDATION | 0 | 0 | 0 | 0 | |
| not0 | * | * | * | SUSPEN-SION | WAIT UNTIL OS=0 | NO CHANGE | | | | |

· IN THE CASE OF MISS: NOTHING IS PERFORMED.
· IN THE CASE OF HIT: A CACHE LINE IS INVALIDATED.
   EVEN IF D IS 1, DATA IS NOT
   WRITTEN BACK TO A MAIN MEMORY.

FIG. 11

INVALIDATE COMMAND INDEX TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | * | 0 | 0 | LINE IS INVALID | PERFORM NOTHING | NO CHANGE | | | | |
| 0 | * | 0 | 1 | | | | | | | (NOT OCCUR) |
| 0 | * | 1 | 0 | LINE IS VALID | INVALIDATION | 0 | 0 | 0 | 0 | |
| 0 | * | 1 | 1 | LINE IS VALID, DIRTY | INVALIDATION | 0 | 0 | 0 | 0 | |
| not0 | * | * | * | SUSPEN-SION | WAIT UNTIL OS=0 | NO CHANGE | | | | |

A CACHE LINE IS SPECIFIED WITH AN INDEX VALUE AND A WAY VALUE, AND WHEN V IS 1, A CACHE LINE IS INVALIDATED.
EVEN IF D IS 1, DATA IS NOT WRITTEN BACK TO A MAIN MEMORY.
WHEN V IS 1, NOTHING IS PERFORMED.

FIG. 12

FLUSH & INVALIDATE COMMAND ADDRESS TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | PERFORM NOTHING | NO CHANGE | | | | |
| 0 | MIS-MATCH | 0 | 1 | | | | | | | (NOT OCCUR) |
| 0 | MIS-MATCH | 1 | 0 | MISS | PERFORM NOTHING | NO CHANGE | | | | |
| 0 | MIS-MATCH | 1 | 1 | MISS | PERFORM NOTHING | NO CHANGE | | | | |
| 0 | MATCH | 0 | 0 | MISS | PERFORM NOTHING | NO CHANGE | | | | |
| 0 | MATCH | 0 | 1 | | | | | | | (NOT OCCUR) |
| 0 | MATCH | 1 | 0 | HIT | INVALIDATION | 0 | 0 | 0 | 0 | |
| 0 | MATCH | 1 | 1 | HIT | WRITE-BACK, AND INVALIDATION | 0 | 1 | 0 | 0 | |
| not0 | * | * | * | SUSPEN-SION | WAIT UNTIL OS=0 | NO CHANGE | | | | |

- IN THE CASE OF MISS: NOTHING IS PERFORMED.
- IN THE CASE OF HIT: A CACHE LINE IS INVALIDATED.
  FURTHERMORE, WHEN D IS 1, DATA IS WRITTEN BACK TO A MAIN MEMORY.

FIG. 13

FLUSH & INVALIDATE COMMAND INDEX TYPE

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | * | 0 | 0 | LINE IS INVALID | PERFORM NOTHING | NO CHANGE | | | | |
| 0 | * | 0 | 1 | | | | | | | (NOT OCCUR) |
| 0 | * | 1 | 0 | LINE IS VALID | INVALIDATION | 0 | 0 | 0 | 0 | |
| 0 | * | 1 | 1 | LINE IS VALID, DIRTY | WRITE-BACK, AND INVALIDATION | 0 | 1 | 0 | 0 | |
| not0 | * | * | * | SUSPEN-SION | WAIT UNTIL OS=0 | NO CHANGE | | | | |

A CACHE LINE IS SPECIFIED WITH AN INDEX VALUE AND A WAY VALUE, AND WHEN V IS 1, A CACHE LINE IS INVALIDATED.
FURTHERMORE, WHEN D IS 1, DATA IS WRITTEN BACK TO A MAIN MEMORY.

FIG. 14

ALLOCATE COMMAND

| BEFORE TRANSITION | | | | STATE | OPERATION | AFTER TRANSITION | | | | REMARKS |
|---|---|---|---|---|---|---|---|---|---|---|
| ROS/WOS | TAG | V | D | | | ROS | WOS | V | D | |
| 0 | MIS-MATCH | 0 | 0 | MISS | RESERVE WAY | 0 | 0 | 1 | 0 | |
| 0 | MIS-MATCH | 0 | 1 | | | | | | | (NOT OCCUR) |
| 0 | MIS-MATCH | 1 | 0 | MISS | RESERVE WAY | 0 | 0 | 1 | 0 | |
| 0 | MIS-MATCH | 1 | 1 | MISS | WRITE-BACK, AND RESERVE WAY | 0 | 1 | 1 | 0 | |
| 0 | MATCH | 0 | 0 | MISS | RESERVE WAY | 0 | 0 | 1 | 0 | |
| 0 | MATCH | 0 | 1 | | | | | | | (NOT OCCUR) |
| 0 | MATCH | 1 | 0 | HIT | PERFORM NOTHING | NO CHANGE | | | | |
| 0 | MATCH | 1 | 1 | HIT | PERFORM NOTHING | NO CHANGE | | | | |
| not0 | * | * | * | SUSPEN-SION | WAIT UNTIL OS=0 | NO CHANGE | | | | |

· IN THE CASE OF MISS:A CACHE LINE IS ALLOCATED.
  DATA IS NOT READ FROM A MAIN MEMORY
  (ONLY UPDATE OF TAG AND V).
· IN THE CASE OF HIT:NOTHING IS PERFORMED.

FIG. 15

CACHE MEMORY, CACHE MEMORY CONTROL UNIT, AND METHOD OF CONTROLLING THE CACHE MEMORY

CROSS REFERENCE TO RELATED APPLICATIONS

This application is a Continuation of U.S. application Ser. No. 14/205,418, filed Mar. 12, 2014, which claims the benefit of Japanese Priority Patent Application JP 2013-061360 filed Mar. 25, 2013, the entire contents of which are incorporated herein by reference.

BACKGROUND

The present technology relates to a cache memory. In particular, the technology relates to a cache memory of a set associative type capable of issuing following access without waiting a response to preceding access to a memory, a cache memory control unit, and a method of controlling the cache memory.

A cache memory has been used as a measure of decreasing an access frequency from a processor to a main memory. Such use of the cache memory has been investigated since a degree of reduction in completion time of access to a main memory is smaller than a degree of increase in processing speed of the processor. The main memory is relatively low in cost per unit capacity, but is relatively long in access completion time. In contrast, the cache memory is relatively high in cost per unit capacity, but is relatively short in access completion time. Reduction in cost is achieved together with reduction in access completion time by providing a hierarchized storage mechanism having a cache memory between a processor and a main memory.

Recently, a system including a plurality of processors is becoming a mainstream system among systems including processors. Advancement of hierarchization of the above-described storage mechanism leads to use of a secondary cache or a tertiary cache that may be a storage device shared by a plurality of processors.

When a processor accesses the cache memory, desired data preferably exists on a cache memory. However, the desired data may not actually exist on the cache memory, leading to a cache miss. In such a case, when the cache memory is one stage closer to the processor than a main memory, access from the cache memory to the main memory occurs.

In the case of a cache memory shared by a plurality of processors, there is an issue of how the entire system efficiently performs processing during such access to the main memory until completion of the access without interruption of operation. The following approach may be taken to solve the issue.

(1) When following access to that cache memory results in a cache hit, the processing is continued (hit under miss).

(2) In addition to the (1), when following access to that cache memory results in a cache miss, the processing is also continued (miss under miss).

When such hit under miss or miss under miss is tried to be achieved, access to that cache line is necessary to be suspended until a fill or write-back process due to a cache miss is completed. Therefore, in a previously proposed cache memory, for example, a flag, which indicates whether access is suspended or not, is provided for each cache line in order to suspend that cache line until a fill process is completed (for example, Japanese Unexamined Patent Application Publication Nos. H6-149673 and 2010-033480).

SUMMARY

In the above-described existing approach, access to a relevant cache line is suspended by providing a flag for each cache line. However, when such flags, management of valid and dirty, and cache-line selection control are provided in combination, a circuit scale is increased, and verification of such functions is disadvantageously complicated.

It is desirable to achieve access suspension in a cache memory in a simple configuration.

According to an embodiment of the present technology, there is provided a cache memory, including: a tag storage section in which one of a plurality of indexes, each index containing a plurality of tag addresses and one suspension-indicating section, is looked up by a first address portion of an accessed address: a data storage section configured to store each of data corresponding to the plurality of tag addresses for each of the plurality of indexes: a tag control section configured to, when the suspension-indicating section contained in the looked-up index indicates suspension, allow access relevant to the accessed address to wait, and when the suspension-indicating section contained in the looked-up index indicates non-suspension, compare a second address portion different from the first address portion of the accessed address to each of the plurality of tag addresses contained in the looked-up index, and detects a tag address matched with the second address portion; and a data control section configured to, when the suspension-indicating section contained in the looked-up index indicates non-suspension, select, from the data storage section, data corresponding to the tag address matched with the second address portion among the plurality of tag addresses contained in the looked-up index. Consequently, there is provided a function of determining whether processing of the cache memory is allowed to wait or not by referring the suspension-indicating section contained in the looked-up index.

Advantageously, the suspension-indicating section may include a read-induced suspension-indicating section configured to indicate suspension induced by a read process, and a write-induced suspension-indicating section configured to indicate suspension induced by a write process, and when one or both of the read-induced suspension-indicating section and the write-induced suspension-indicating section indicates suspension in the looked-up index, the tag control section allows the access relevant to the accessed address to wait. Consequently, there is provided a function of separating off a process causing suspension.

Advantageously, the cache memory may be a common cache memory shared by a plurality of masters.

According to an embodiment of the present technology, there is provided a cache memory control unit, including: a tag storage section in which one of a plurality of indexes, each index containing a plurality of tag addresses and one suspension-indicating section, is looked up by a first address portion of an accessed address; and a tag control section configured to, when the suspension-indicating section contained in the looked-up index indicates suspension, allow access relevant to the accessed address to wait, and when the suspension-indicating section contained in the looked-up index indicates non-suspension, compare a second address portion different from the first address portion of the accessed address to each of the plurality of tag addresses contained in the looked-up index, and detects a tag address matched with the second address portion. Consequently, there is provided a function of determining whether access is allowed to wait or not by referring the suspension-indicating section contained in the looked-up index.

According to an embodiment of the present technology, there is provided a method of controlling a cache memory that includes a tag storage section in which one of a plurality of indexes, each index containing a plurality of tag addresses and one suspension-indicating section, is looked up by a first address portion of an accessed address, the method including: when the suspension-indicating section contained in the looked-up index indicates suspension, allowing access relevant to the accessed address to wait; and when the suspension-indicating section contained in the looked-up index indicates non-suspension, comparing a second address portion different from the first address portion of the accessed address to each of the plurality of tag addresses contained in the looked-up index, and detecting a tag address matched with the second address portion. Consequently, there is provided a function of determining whether access is allowed to wait or not by referring the suspension-indicating section contained in the looked-up index.

According to any of the above-described embodiments, there is provided an excellent effect of achieving access suspension in the cache memory in a simple configuration.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 6 is a diagram illustrating a state transition example of the secondary cache 200 in response to a read instruction in the embodiment of the present technology.

FIG. 7 is a diagram illustrating a state transition example of the secondary cache 200 in response to a write instruction in the embodiment of the present technology.

FIG. 8 is a diagram illustrating a state transition example of the secondary cache 200 in response to a fill instruction in the embodiment of the present technology.

FIG. 9 is a diagram illustrating a state transition example of the secondary cache 200 in response to a flush instruction address type in the embodiment of the present technology.

FIG. 10 is a diagram illustrating a state transition example of the secondary cache 200 in response to a flush instruction index type in the embodiment of the present technology.

FIG. 11 is a diagram illustrating a state transition example of the secondary cache 200 in response to an invalidate instruction address type in the embodiment of the present technology.

FIG. 12 is a diagram illustrating a state transition example of the secondary cache 200 in response to an invalidate instruction index type in the embodiment of the present technology.

FIG. 13 is a diagram illustrating a state transition example of the secondary cache 200 in response to a flush-and-invalidate instruction address type in the embodiment of the present technology.

FIG. 14 is a diagram illustrating a state transition example of the secondary cache 200 in response to a flush-and-invalidate instruction index type in the embodiment of the present technology.

FIG. 15 is a diagram illustrating a state transition example of the secondary cache 200 in response to an allocate instruction in the embodiment of the present technology.

DETAILED DESCRIPTION

Hereinafter, an embodiment of the present technology is described. Description is made in the following order.
1. Embodiment (Example of outstanding management while read and write are separated).
2. Modification (Example of outstanding management while read and write are not separated).
[1. Embodiment]
[Configuration of Information Processing System]

Figure 1:
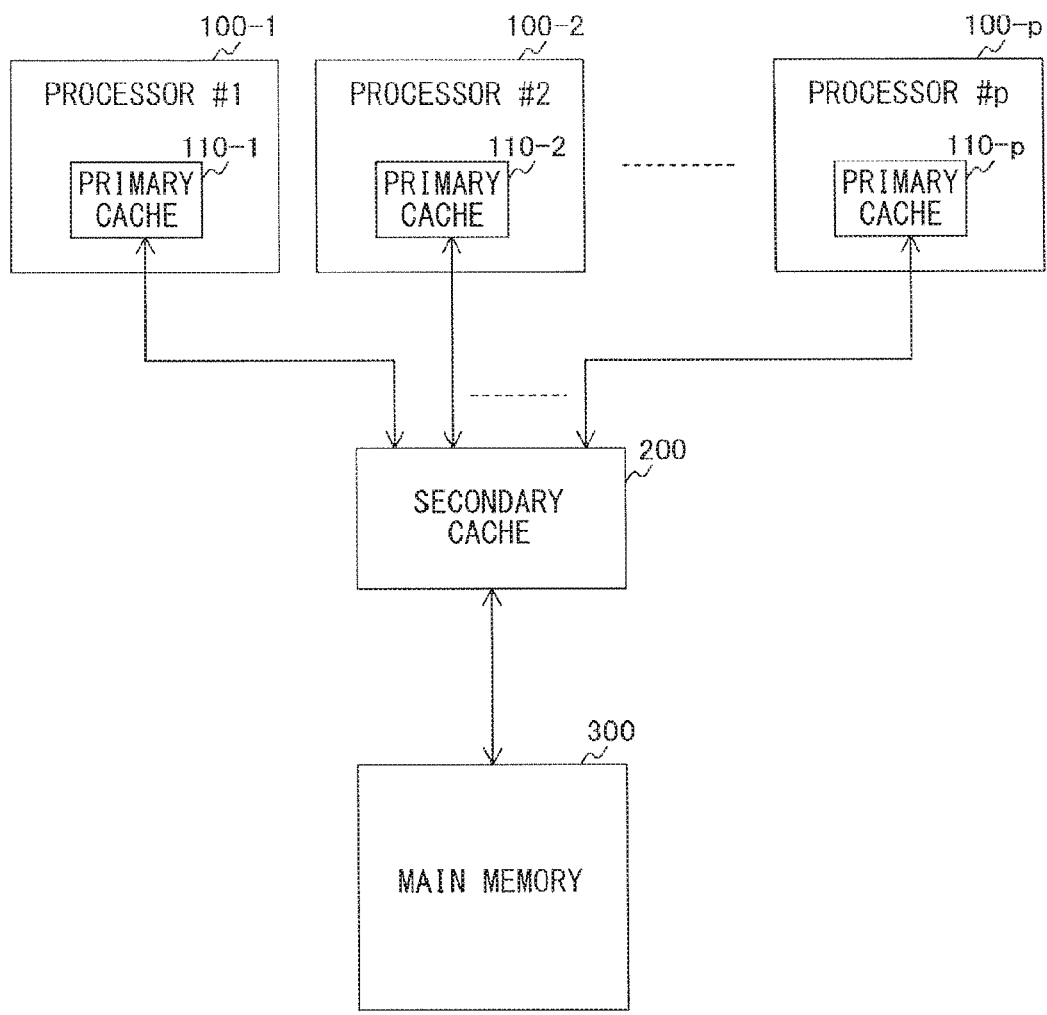
FIG. 1 is a diagram illustrating a configuration example of an information processing system in an embodiment of the present technology.

FIG. 1 is a diagram illustrating a configuration example of an information processing system in an embodiment of the present technology. The information processing system includes p (p is an integer of 1 or more) processors 100-1 to 100-p (hereinafter, such processors may be collectively referred to as processors 100), a secondary cache 200, and a main memory 300.

The respective processors 100 internally includes primary caches 110-1 to 110-p (hereinafter, such processors may be collectively referred to as primary caches 110). Consequently, as long as the primary cache 110 is hit, the processor 100 performs data access using the primary cache 110. When the primary cache 110 is miss-hit, the processor 100 accesses the secondary cache 200. When the primary cache 110 is miss-hit, and as long as the secondary cache 200 is hit, the processor 100 performs data access using the secondary cache 200. On the other hand, when the secondary cache 200 is miss-hit, the processor 100 accesses the main memory 300.

In this way, the embodiment of the technology has a tri-level storage structure configured of the primary caches 110 of the respective processors 100, the secondary cache 200 shared by the processors 100, and the main memory 300. When the processor 100 is considered as a master, the secondary cache 200 serves as a common cache memory shared by a plurality of masters.

[Configuration of Secondary Cache]

Figure 2:
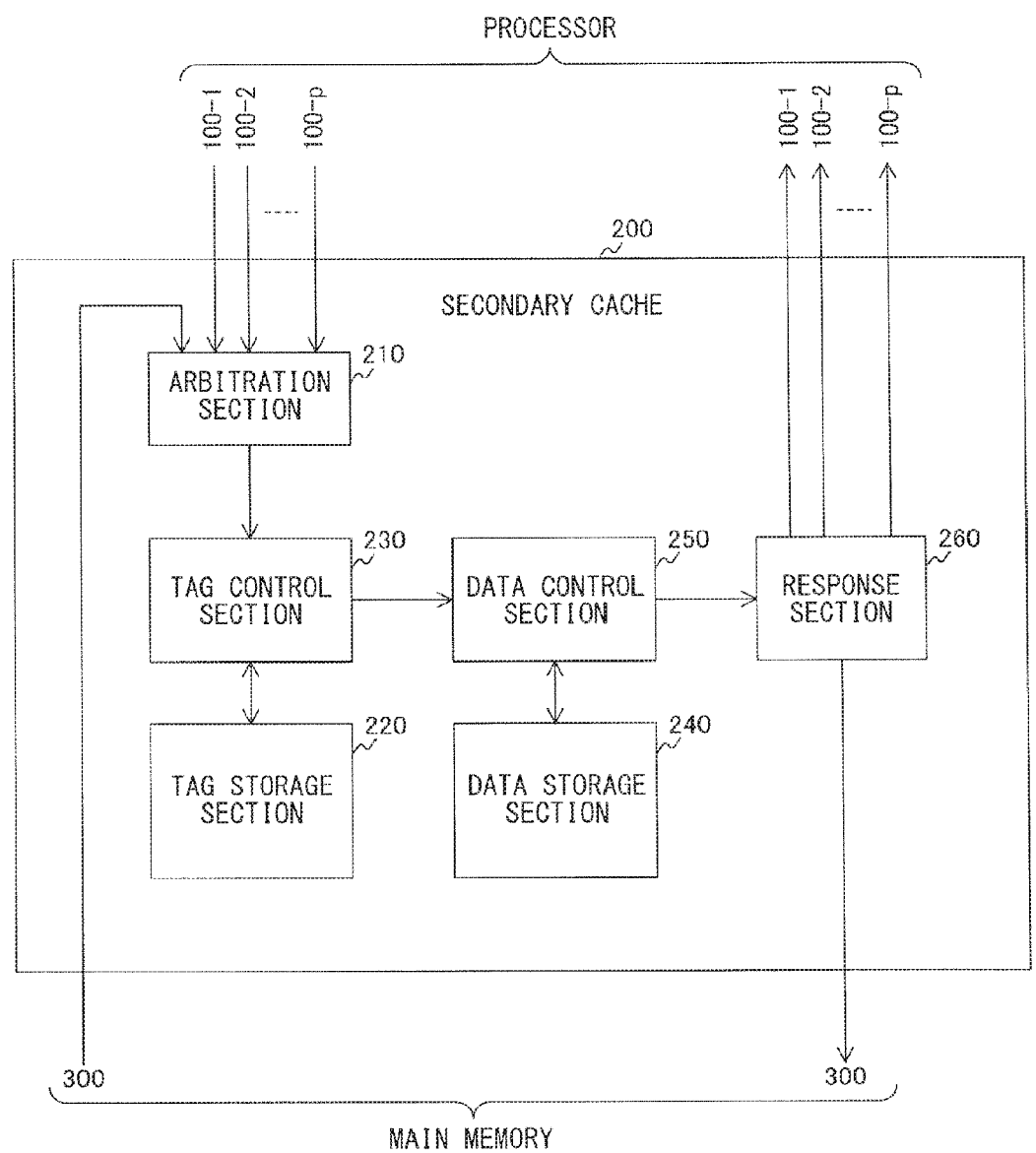
FIG. 2 is a diagram illustrating a functional configuration example of a secondary cache 200 in the embodiment of the present technology.

FIG. 2 is a diagram illustrating a functional configuration example of the secondary cache 200 in the embodiment of the present technology. The secondary cache 200 includes an arbitration section 210, a tag storage section 220, a tag control section 230, a data storage section 240, a data control section 250, and a response section 260.

The arbitration section 210 arbitrates access from each of the processors 100-1 to 100-p and the main memory 300, and gives access permit to one of them. In a possible arbitration by the arbitration section 210, for example, access permit may be sequentially allocated to the processors 100-1 to 100-p and the main memory 300 in round-robin fashion. The permitted access is supplied to the tag control section 230.

The tag storage section 220 is a memory configured of a plurality of entries, and holds a tag address, etc. in each entry. As described later, the tag address indicates a part of an accessed address. Each entry of the tag storage section 220 is looked up by another part of the accessed address.

The tag control section 230 selects and controls an entry to be accessed in the tag storage section 220 based on the accessed address. The entry selected by the tag control section 230 is notified to the data control section 250.

The data storage section 240 stores data corresponding to each entry of the tag storage section 220. The data is stored in the data storage section 240 while being managed for each cache line. In addition, the data is transferred to/from the main memory 300 or each processor 100 for each cache line.

The data control section 250 accesses data (a cache line) stored in the data storage section 240 according to the entry selected by the tag control section 230. In the case of read access or write-back operation, data read from the data storage section 240 is supplied to the response section 260. In the case of write access, write data is buried at a corresponding position in the data read from the data storage section 240, and is stored in the data storage section 240 again.

The response section 260 outputs the data supplied from the data control section 250 to one of the processors 100-1 to 100-p or the main memory 300. In the case of a response to read access from the processor 100, the data is output to a processor 100 that has performed the access. In the case of write-back operation to the main memory 300, the data is output to the main memory 300.

Figure 3:
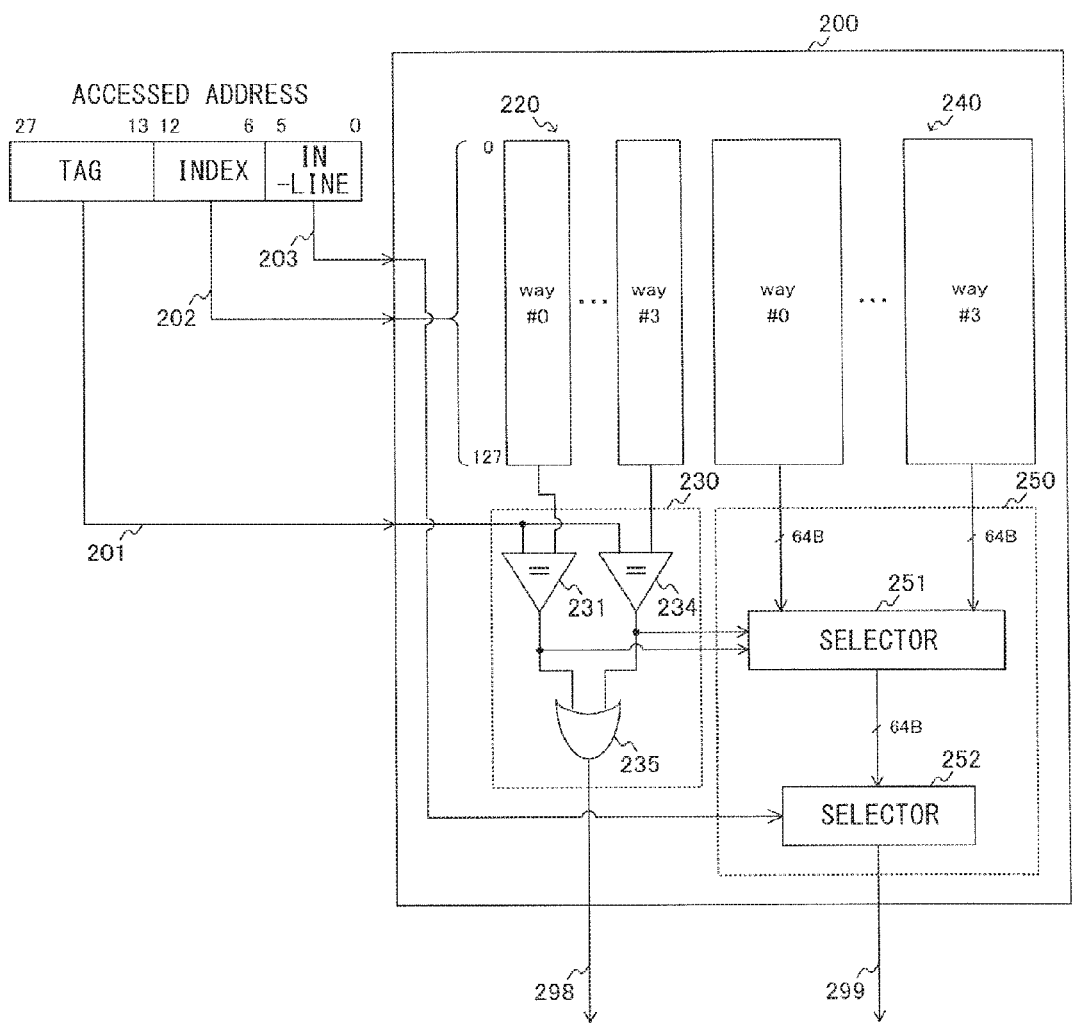
FIG. 3 is a diagram illustrating a circuit configuration example of the secondary cache 200 in the embodiment of the present technology.

FIG. 3 is a diagram illustrating a circuit configuration example of the secondary cache 200 in the embodiment of the present technology. Here, a four-way set associative cache having a line number of 128 and a line size of 64 bytes (B) is assumed as the secondary cache 200. Specifically, up to four cache lines are allowed to be stored for the same index address, and data size corresponding to each cache line is 64 B.

When a region of the main memory 300 is 256 MB, a necessary address includes 28 bits. Since a block size is 64 B, a zeroth bit to a fifth bit, i.e., six bits in total, of an accessed address are allocated to an in-line address. Since the number of lines is 128, an index address for lookup of the entries of the tag storage section 220 is allocated to a sixth bit to a twelfth bit, i.e., seven bits in total, of the accessed address. As a result, the tag address is allocated to a thirteenth bit to a twenty-seventh bit, i.e., fifteen bits in total, of the accessed address. The tag address, the index address, and the in-line address of the accessed address are supplied to the secondary cache 200 through a signal line 201, a signal line 202, and a signal line 203, respectively.

The tag storage section 220 includes four ways, i.e., way #0 to way #3, that are each configured of 128 entries. Each way of the tag storage section 220 is looked up by the index address supplied through the signal line 202. In this example, therefore, four entries are looked up.

The tag control section 230 includes comparators 231 to 234 and a logical sum operator 235, and detects an entry having a matched tag address among the looked-up entries in the tag storage section 220. The comparator 231 compares a tag address contained in the entry looked up in the way #0 of the tag storage section 220 to a tag address supplied through the signal line 201, and detects matching between the tag addresses. The comparator 232 compares a tag address contained in the entry looked up in the way #1 of the tag storage section 220 to a tag address supplied through the signal line 201, and detects matching between the tag addresses. Similarly, the comparator 233 copes with the way #2 of the tag storage section 220, and the comparator 234 copes with the way #3 of the tag storage section 220. Comparison results of such comparators 231 to 234 are supplied to the logical sum operator 235 and the data control section 250. When one of the comparators 231 to 234 detects matching, the logical sum operator 235 outputs a notice of hitting through a signal line 298. However, as described later, in the case where a valid bit of a corresponding entry indicates invalid, the comparison result is determined to be mishit.

The data storage section 240 includes four ways, i.e., way #0 to way #3, that are each configured of 128 cache lines, and stores data corresponding to each entry of the tag storage section 220. As with the tag storage section 220, the data storage section 240 is looked up by the index address supplied through the signal line 202. Consequently, four 64 B line data are supplied to the data control section 250.

The data control section 250 includes selectors 251 and 252. The selector 251 selects one of the four 64 B data supplied from the data storage section 240. Specifically, when the comparator 231 detects matching, the line data of the way #0 of the data storage section 240 is selected. When the comparator 232 detects matching, the line data of the way #1 of the data storage section 240 is selected. When the comparator 233 detects matching, the line data of the way #2 of the data storage section 240 is selected. When the comparator 234 detects matching, the line data of the way #3 of the data storage section 240 is selected. However, as described later, in the case where a valid bit of the entry, in which matching is detected, indicates invalid, data of that cache line is not selected. When both of the comparators 231 and 232 do not detect matching, data of any cache line is not selected.

The selector 252 selects data at a position specified as an in-line address in the selected line data. The in-line address is supplied through the signal line 203. However, such a function of the selector 252 may be provided in the processors 100. In each case, the entire or partial line data is output to the response section 260 through the signal line 299.

Figure 4:
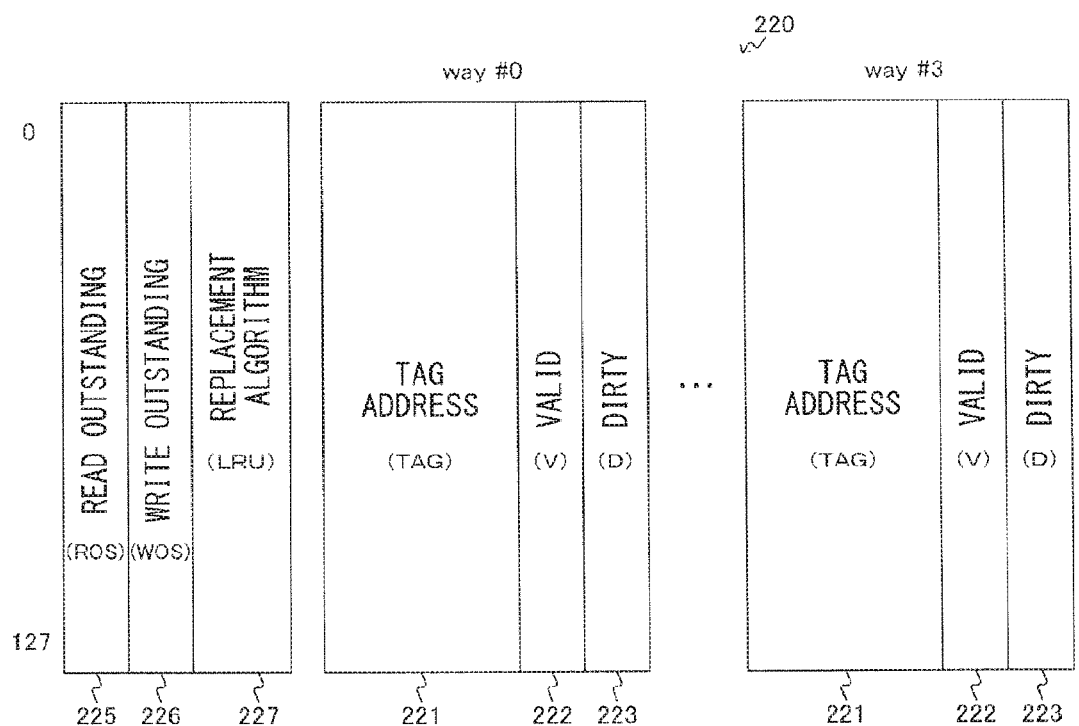
FIG. 4 is a diagram illustrating a configuration example of a tag storage section 220 in the embodiment of the present technology.

FIG. 4 is a diagram illustrating a configuration example of the tag storage section 220 in the embodiment of the present technology. The tag storage section 220 includes fields of a tag address 221, valid 222, and dirty 223 in each of the cache lines in four ways. The tag storage section 220 further includes fields of read outstanding 225, write outstanding 226, and a replacement algorithm 227 in each index.

The tag address 221 stores a tag address (high 15 bits of an address) of a cache line corresponding to that entry. In the drawing, the tag address 221 is abbreviated as "TAG".

The valid 222 stores a valid bit (Valid) indicating validity of that entry. When the valid 222 indicates "1", data of the cache line corresponding to that entry is valid. When the valid 222 indicates "0", hit determination is not made even if one of the comparators 231 to 234 detects matching. In the drawing, the valid 222 is abbreviated as "V".

The dirty 223 stores a dirty bit (Dirty) indicating mismatch of data of the cache line corresponding to that entry with data of the main memory 300. If the dirty 223 indicates "1", the data of the cache line corresponding to that entry does not match with the data of the main memory 300, i.e., data of the secondary cache 200 is the latest data. On the other hand, if the dirty 223 indicates "0", the data of the cache line corresponding to that entry matches with the data of the main memory 300. In the drawing, the dirty 223 is abbreviated as "D".

The read outstanding 225 stores a read outstanding bit (Read_Outstanding) indicating that one of the cache lines corresponding to that index is in a wait state of read from the main memory 300. If the read outstanding 225 indicates "1", the wait state of read from the main memory 300 occurs in one of the cache lines corresponding to that index. On the other hand, if the read outstanding 225 indicates "0", the wait state of read from the main memory 300 does not occur in any of the cache lines corresponding to that index. Such a wait state of read occurs during a fill process of a cache line. When appropriate data is read from the main memory 300 and written into an appropriate cache line, the fill process is completed and the read outstanding (ROS) is cleared. In the drawing, the read outstanding 225 is abbreviated as "ROS". It is to be noted that the read outstanding 225 corresponds to an example of the suspension-indicating section according to the appended claims.

The write outstanding 226 stores a write outstanding bit (Write_Outstanding) indicating that one of the cache lines corresponding to that index is in a wait state of write into the main memory 300. If the write outstanding 226 indicates "1", a wait state of write into the main memory 300 occurs in one of the cache lines corresponding to that index. On the other hand, if the write outstanding 226 indicates "0", a wait state of write into the main memory 300 does not occur in any of the cache lines corresponding to that index. Such a wait state of write occurs during a write-back process of a cache line. When a notice that write is completed in response to a write instruction to the main memory 300, the write-back process is completed, and the write outstanding (WOS) is cleared. In the drawing, the write outstanding 226 is abbreviated as "WOS". It is to be noted that the write outstanding 226 corresponds to an example of the suspension-indicating section according to the appended claims.

The replacement algorithm 227 stores information for determining a way to be replaced when each index stores a new cache line. Although any type of replacement algorithms may be used in this embodiment, a method where a cache line that is not least recently used (LRU) is evicted is assumed to be used here. In the drawing, the replacement algorithm 227 is abbreviated as "LRU".

Thus, the read outstanding 225 and the write outstanding 226 are separately managed, thereby the subsequent fill operation is allowed to be securely performed after completion of the write operation. This makes it possible to maintain order of a certain write-back operation and a following fill operation of the same address. For example, an AXI bus may be listed as a protocol having a response indicating completion of write operation as assumed in this embodiment.

[Operation of Secondary Cache]

Figure 5:
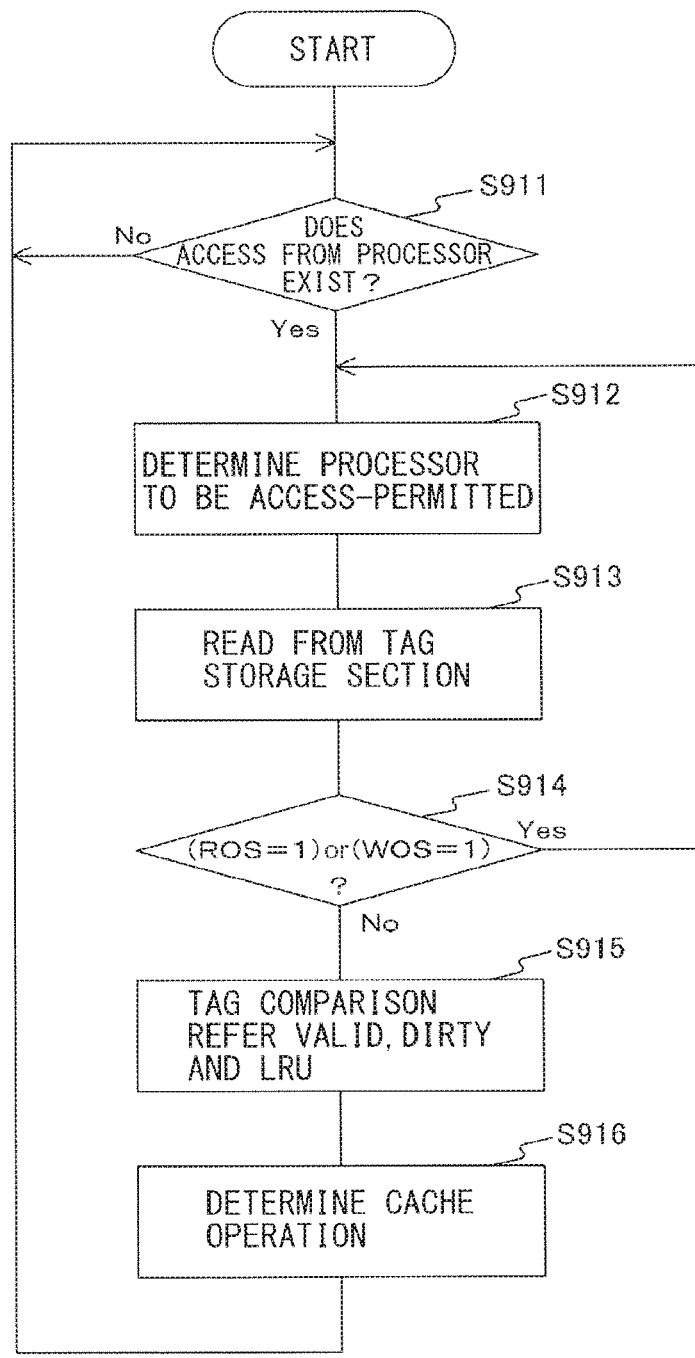
FIG. 5 is a flowchart illustrating a processing procedure example of the secondary cache 200 in the embodiment of the present technology.

FIG. 5 is a flowchart illustrating a processing procedure example of the secondary cache 200 in the embodiment of the present technology.

First, when access from a processor 100 to the secondary cache 200 exists (step S911: Yes), the arbitration section 210 determines which one of the plurality of processors 100-1 to 100-$p$ is access-permitted (step S912). The tag storage section 220 is looked up according to an address accessed by the permitted processor 100, and a tag and other types of information are read (step S913).

At this time, when the read outstanding bit or the write outstanding bit of the read index indicates "1" (step S914: Yes), that access is suspended, and the process is returned to the arbitration processing (step S912). On the other hand, when both the read outstanding bit and the write outstanding bit indicate "0" (step S914: No), that access is permitted, and comparison of tags is performed, and a valid bit, etc., is referred (step S915). Consequently, cache operation is determined (step S916). Subsequently, fields of the tag address 221, the valid 222, and the dirty 223 are updated.

As seen from this flowchart, in this embodiment, since the read outstanding bit and the write outstanding bit are checked in a stage before tag comparison, etc., processing is allowed to be roughly divided into two stages, leading to simplification of control.

When a response is made from the main memory 300 independent of this sequential flowchart, the read outstanding bit or the write outstanding bit of an objective cache line is cleared. In the case of the fill process, data from the main memory 300 is stored in the secondary cache 200.

[State Transition of Secondary Cache]

State transition of the secondary cache 200 is now described separately in individual processes. In the embodiment of the present technology, when V is "0", D is also "0" in any case, a case of V=0 and D=1 may not occur. Furthermore, ROS/WOS=0 means that each of the read outstanding bit and the write outstanding bit is "0". On the other hand, ROS/WOS=1 means that one or both of the read outstanding bit and the write outstanding bit is "1". In each item, "*" means that a value or a state is not specified.

FIG. 6 is a diagram illustrating a state transition example of the secondary cache 200 in response to a read instruction in the embodiment of the present technology. The read instruction is issued from a processor 100 in order to read data from the main memory 300. The secondary cache 200 is connected between the processor 100 and the main memory 300, and performs the following operation upon reception of the read instruction issued from the processor 100.

When one or both of ROS and WOS is "1", a read process is suspended and waits until each of ROS and WOS becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and data is read from a corresponding cache line. At this time, even if D is 1, write-back to the main memory 300 is not performed. In this case, the state of each of V, D, ROS, and WOS is not changed.

If any of the comparators 231 to 234 does not detect tag address matching, or if V is 0 even if such matching is detected, mishit determination is basically made. Hence, when tag address matching is not detected, a way to be replaced is determined by the LRU method, etc., and fill operation of an appropriate cache line is performed from the main memory 300. At this time, if D is 1, write-back to the main memory 300 is also performed before the replacement. At this time, if D is 1, write-back to the main memory 300 is performed before the replacement. If V is 0 even if such matching is detected, a new way may not be determined; hence, fill operation of that cache line may be performed from the main memory 300. In such cases, when an instruction of fill operation is issued to the main memory 300, the state is transitioned to a state of ROS=1. When an instruction of write-back operation is issued, the state is transitioned to a state of WOS=1.

FIG. 7 is a diagram illustrating a state transition example of the secondary cache 200 in response to a write instruction in the embodiment of the present technology. This write instruction is issued from a processor 100 in order to write data into the main memory 300. The secondary cache 200 is connected between the processor 100 and the main memory 300, and performs the following operation upon reception of the write instruction issued from the processor 100.

When one or both of ROS and WOS is "1", a write process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and data is written into a corresponding cache line. At this time, even if D is 1, write-back to the main memory 300 is not performed. After write is performed, the state becomes a state of D=1.

If any of the comparators 231 to 234 does not detect tag address matching, or if V is 0 even if such matching is detected, mishit determination is basically made. Hence, when tag address matching is not detected, a way to be replaced is determined by the LRU method, etc., and fill operation of an appropriate cache line is performed from the main memory 300, and then data is written. At this time, if D is 1, write-back to the main memory 300 is also performed before the replacement. If V is 0 even if such matching is detected, a new way may not be determined; hence, fill operation of that cache line may be performed from the main memory 300. In such cases, when an instruction of fill operation is issued to the main memory 300, the state is transitioned to a state of ROS=1. When an instruction of write-back operation is issued, the state is transitioned to a state of WOS=1.

FIG. 8 is a diagram illustrating a state transition example of the secondary cache 200 in response to a fill instruction in the embodiment of the present technology. The fill instruction is an instruction for reading a cache line from the main memory 300 to the secondary cache 200. However, when the secondary cache 200 is hit, that cache line may be directly used; hence, no operation is performed.

When one or both of ROS and WOS is "1", a fill process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and no operation is performed. In this case, the state of each of V, D, ROS, and WOS is not changed.

If any of the comparators 231 to 234 does not detect tag address matching, or if V is 0 even if such matching is detected, mishit determination is basically made. Hence, when tag address matching is not detected, a way to be replaced is determined by the LRU method, etc., and fill operation of an appropriate cache line is performed from the main memory 300. At this time, if D is 1, write-back to the main memory 300 is also performed before the replacement. In such cases, when an instruction of fill operation is issued to the main memory 300, the state is transitioned to a state of ROS=1. When an instruction of write-back operation is issued, the state is transitioned to a state of WOS=1.

FIG. 9 is a diagram illustrating a state transition example of the secondary cache 200 in response to a flush instruction address type in the embodiment of the present technology. The flush instruction is an instruction for writing back a cache line to the main memory 300. In the case of the flush instruction address type, an objective cache line is specified by an address.

When one or both of ROS and WOS is "1", a flush process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made. At this time, if D is 1, write-back is performed. When an instruction of write-back operation is issued, the state is transitioned to a state of WOS=1.

If any of the comparators 231 to 234 does not detect tag address matching, or if V is 0 even if such matching is detected, mishit determination is basically made, and no operation is performed. In this case, the state of each of V, D, ROS, and WOS is not changed.

FIG. 10 is a diagram illustrating a state transition example of the secondary cache 200 in response to a flush instruction index type in the embodiment of the present technology. In the case of the flush instruction index type, an objective cache line is specified by an index value and a way value. As a result, processing is performed independent of comparison results by the comparators 231 to 234.

When one or both of ROS and WOS is "1", a flush process is suspended and waits until each of them becomes "0". During such waiting, access to the secondary cache 200 according to another instruction is acceptable. In this case, the state of each of V, D, ROS, and WOS is not changed.

An entry corresponding to the specified index value and way value shows V=1 and D=1, write-back operation is performed. When an instruction of write-back operation is issued, the state is transitioned to a state of WOS=1.

An entry corresponding to the specified index value and way value shows D=0, flush may not be performed: hence, no operation is performed. In this case, the state of each of V, D, ROS, and WOS is not changed.

FIG. 11 is a diagram illustrating a state transition example of the secondary cache 200 in response to an invalidate instruction address type in the embodiment of the present technology. The invalidate instruction is an instruction for invalidation of a cache line. In the case of the invalidate instruction address type, an objective cache line is specified by an address.

When one or both of ROS and WOS is "1", a flush process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and the relevant cache line is invalidated. Consequently, the state of each of V, D, ROS, and WOS is cleared. In this case, even if D is 1, write-back is not performed.

If any of the comparators 231 to 234 does not detect tag address matching, or if V is 0 even if such matching is detected, mishit determination is basically made, and no operation is performed. In this case, the state of each of V, D, ROS, and WOS is not changed.

FIG. 12 is a diagram illustrating a state transition example of the secondary cache 200 in response to an invalidate instruction index type in the embodiment of the present technology. In the case of the invalidate instruction index type, an objective cache line is specified by an index value and a way value. As a result, processing is performed independent of comparison results by the comparators 231 to 234.

When one or both of ROS and WOS is "1", an invalidate process is suspended and waits until each of them becomes "0". During such waiting, access to the secondary cache 200 according to another instruction is acceptable. In this case, the state of each of V, D, ROS, and WOS is not changed.

An entry corresponding to the specified index value and way value shows V=1, the relevant cache line is invalidated. Consequently, the state of each of V, D, ROS, and WOS is cleared. In this case, even if D is 1, write-back is not performed.

An entry corresponding to the specified index value and way value shows V=0, the cache line may not be invalidated: hence, no operation is performed. In this case, the state of each of V, D, ROS, and WOS is not changed.

FIG. 13 is a diagram illustrating a state transition example of the secondary cache 200 in response to a flush-and-invalidate instruction address type in the embodiment of the present technology. The flush-and-invalidate instruction is an instruction for invalidation of a cache line after the cache line is written back to the main memory 300. In the case of the flush-and-invalidate instruction address type, an objective cache line is specified by an address.

When one or both of ROS and WOS is "1", a flush-and-invalidate process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and the relevant cache line is invalidated. At this time, if D is 1, write-back is performed prior to the invalidation. When an instruction of write-back operation is issued, the state is transitioned to a state of WOS=1.

If any of the comparators 231 to 234 does not detect tag address matching, or if V is 0 even if such matching is detected, mishit determination is basically made, and no operation is performed. In this case, the state of each of V, D, ROS, and WOS is not changed.

FIG. 14 is a diagram illustrating a state transition example of the secondary cache 200 in response to a flush-and-invalidate instruction index type in the embodiment of the present technology. In the flush-and-invalidate instruction index type, an objective cache line is specified by an index value and a way value. As a result, processing is performed independent of comparison results by the comparators 231 to 234.

When one or both of ROS and WOS is "1", a flush-and-invalidate process is suspended and waits until each of them becomes "0". During such waiting, access to the secondary cache 200 according to another instruction is acceptable. In this case, the state of each of V, D, ROS, and WOS is not changed.

An entry corresponding to the specified index value and way value shows V=1, the relevant cache line is invalidated. At this time, if D is 1, write-back is performed prior to the invalidation. When an instruction of write-back operation is issued, the state is transitioned to a state of WOS=1.

An entry corresponding to the specified index value and way value shows V=0, the cache line may not be invalidated: hence, no operation is performed. In this case, the state of each of V, D, ROS, and WOS is not changed.

FIG. 15 is a diagram illustrating a state transition example of the secondary cache 200 in response to an allocate instruction in the embodiment of the present technology. The allocate instruction is an instruction for reserving a cache line corresponding to a specified address in the secondary cache 200. However, when the secondary cache 200 is hit, that cache line may be directly used: hence, no operation is performed. Unlike the fill instruction, data is not read from the main memory 300.

When one or both of ROS and WOS is "1", an allocate process is suspended and waits until each of them becomes "0". During such waiting, access to the secondary cache 200 according to another instruction is acceptable. In this case, the state of each of V, D, ROS, and WOS is not changed.

If one of the comparators 231 to 234 detects tag address matching in one of the entries, and if V is 1, hit determination is basically made, and no operation is performed. In this case, the state of each of V, D, ROS, and WOS is not changed.

If any of the comparators 231 to 234 does not detect tag address matching, or if V is 0 even if such matching is detected, mishit determination is basically made. Hence, when tag address matching is not detected, a way to be replaced is determined by the LRU method, etc. At this time, if D is 1, write-back to the main memory 300 is also performed before the way is reserved. When an instruction of write-back operation is issued, the state is transitioned to a state of WOS=1.

[Operation Timing of Secondary Cache]

Operation timing example of the secondary cache 200 is now described in individual cases.

Figure 16:
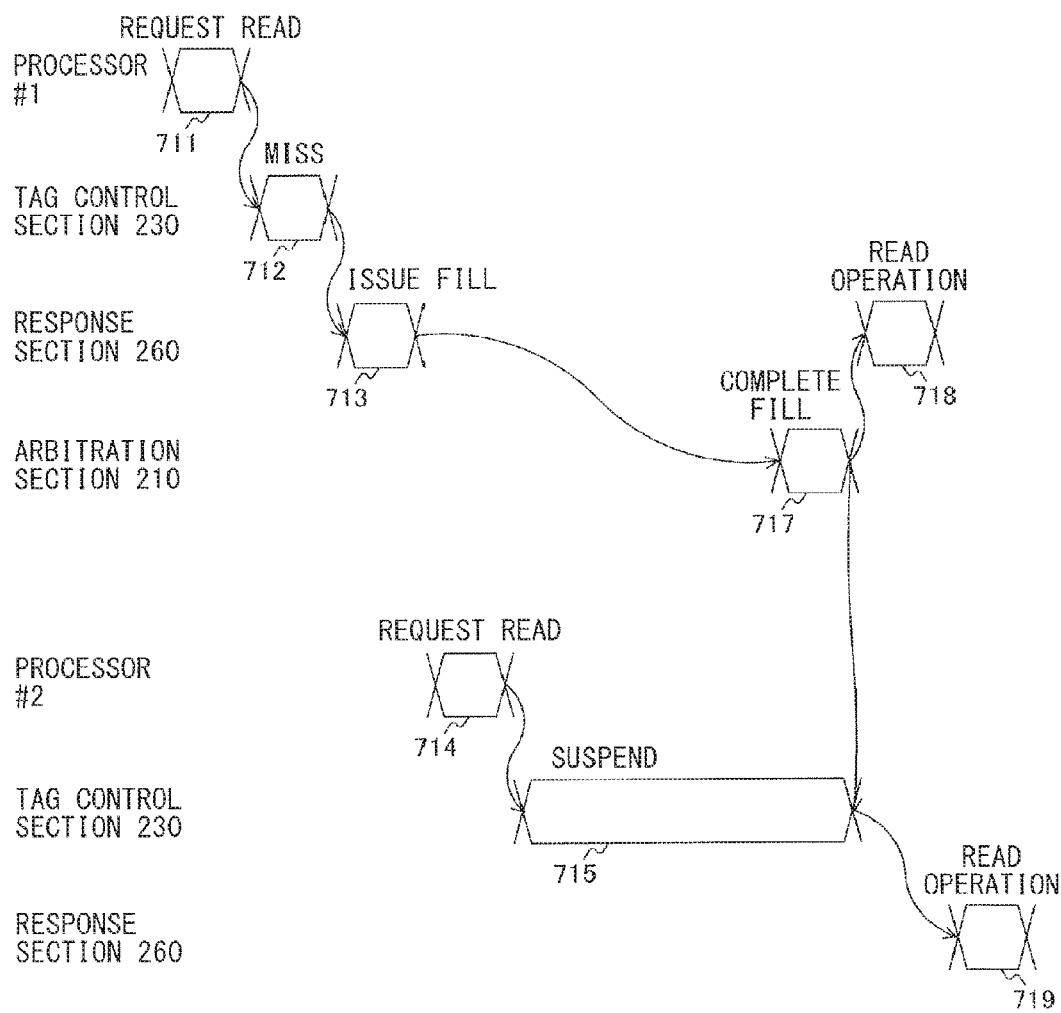
FIG. 16 is a timing chart illustrating a first example of execution of a read instruction in the embodiment of the present technology.

FIG. 16 is a timing chart illustrating a first example of execution of a read instruction in the embodiment of the present technology. This example is made assuming that a fill process is performed in preceding access, and following access is suspended.

It is assumed that the processor #1 (100-1) issues a read instruction (711), and the tag control section 230 of the secondary cache 200 makes mishit determination (712). At this time, the response section 260 of the secondary cache 200 issues an instruction of filling a cache line to the main memory 300 (713). Consequently, ROS becomes 1 in a corresponding cache index.

Subsequently, the processor #2 (100-2) issues a read instruction to the same cache index (714), and the tag control section 230 of the secondary cache 200 detects ROS=1. Consequently, a read process based on the read instruction from the processor #2 is suspended (715).

When the fill process based on the read instruction from the processor #1 is completed (717), ROS becomes 0 in a corresponding cache index, and read operation from the secondary cache 200 is performed with regard to the read instruction from the processor #1 (718). In addition, read operation from the secondary cache 200 is also performed with regard to the read instruction from the processor #2 (719).

Figure 17:
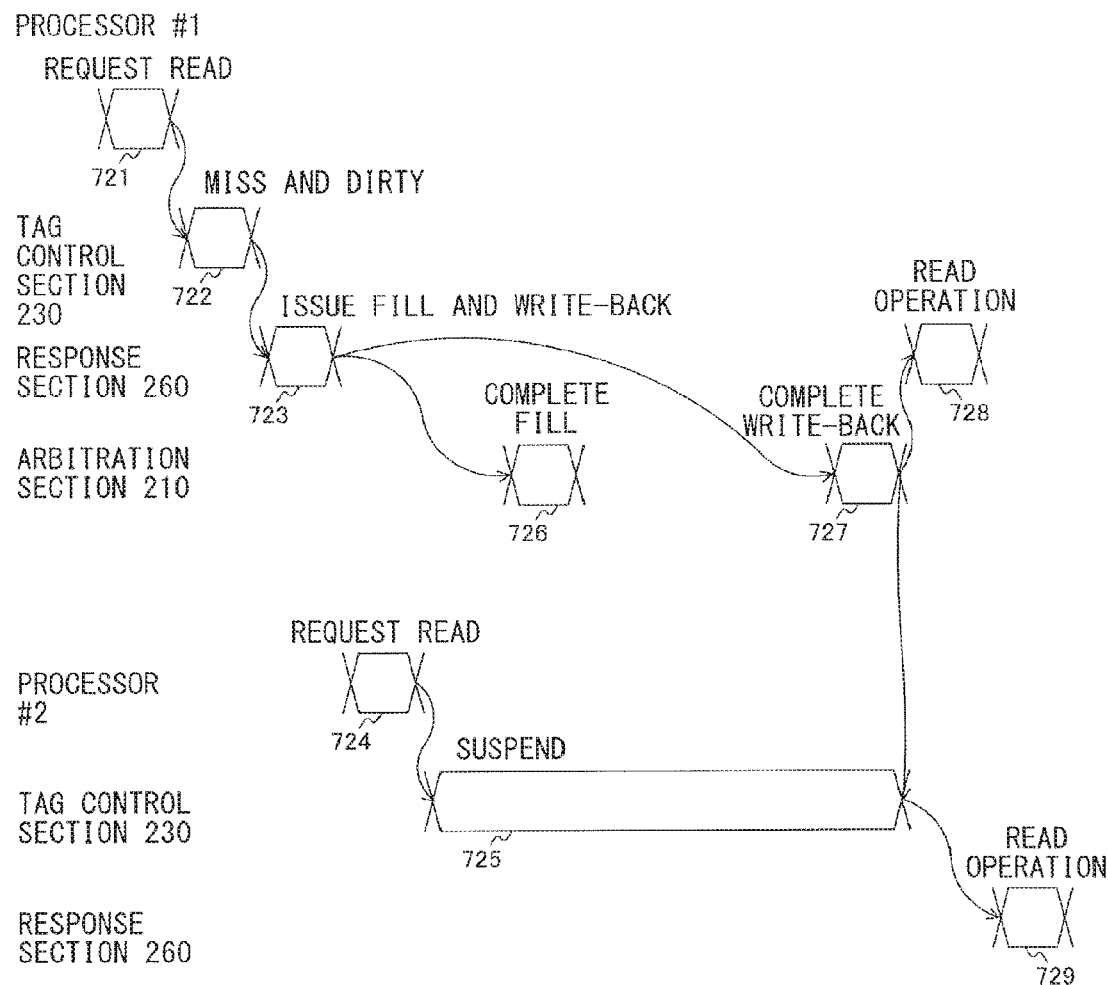
FIG. 17 is a timing chart illustrating a second example of execution of the read instruction in the embodiment of the present technology.

FIG. 17 is a timing chart illustrating a second example of execution of the read instruction in the embodiment of the present technology. This exemplary case is made assuming that a fill process and a write-back process are performed in preceding access, and following access is suspended.

It is assumed that the processor #1 issues a read instruction (721), and the tag control section 230 of the secondary cache 200 makes determination of mishit and dirty (722). At this time, the response section 260 of the secondary cache 200 issues instructions of fill and write-back of a cache line to the main memory 300 (723). Consequently, each of ROS and WOS becomes 1 in a corresponding cache index.

Subsequently, the processor #2 issues a read instruction to the same cache index (724), and the tag control section 230 of the secondary cache 200 detects ROS=1 and WOS=1. Consequently, a read process based on the read instruction from the processor #2 is suspended (725).

Although the instructions of fill and write-back processes are issued at the same time, which process is completed first is varied depending on an external state of the secondary cache 200. Here, the fill process is assumed to be completed first (726 and 727). When both the fill and write-back processes are completed, each of ROS and WOS becomes 0 in a corresponding cache index, and read operation from the secondary cache 200 is performed with regard to the read instruction from the processor #1 (728). In addition, read operation from the secondary cache 200 is also performed with regard to the read instruction from the processor #2 (729).

Figure 18:
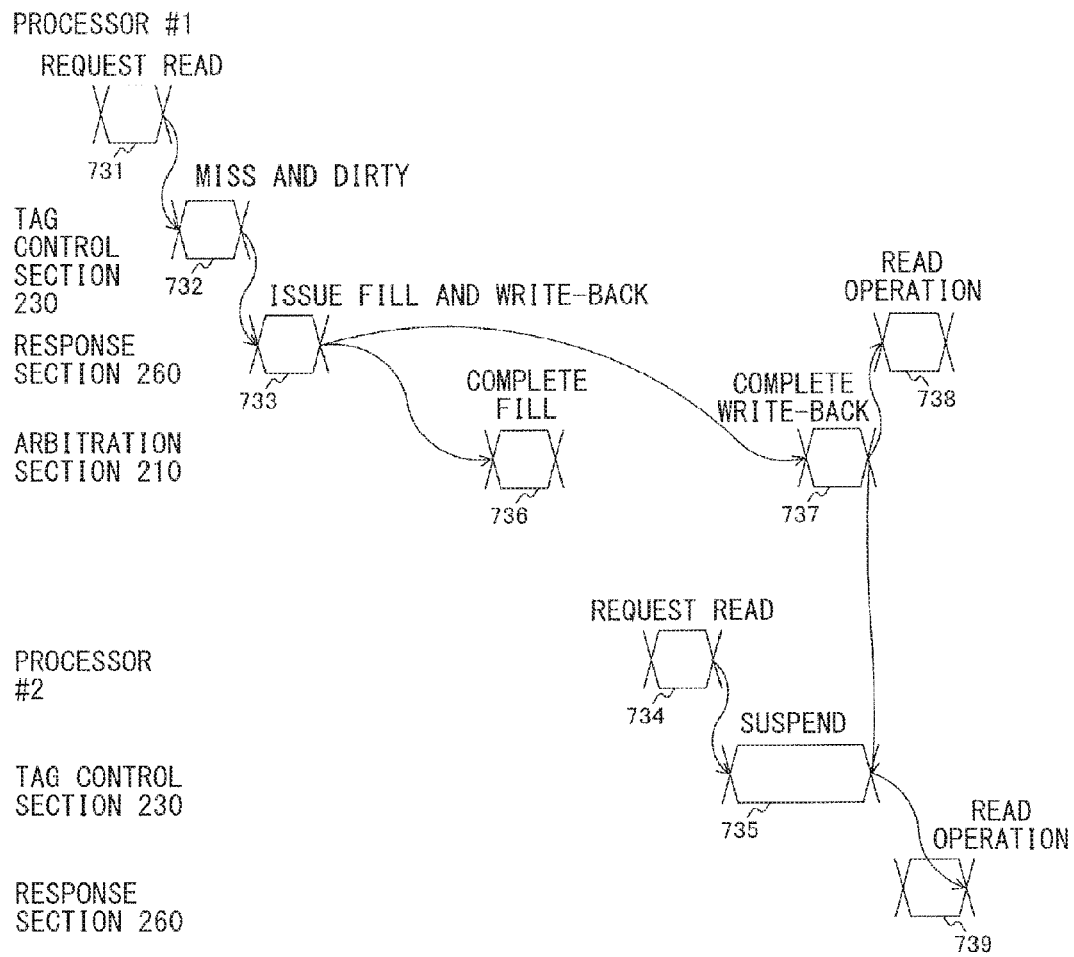
FIG. 18 is a timing chart illustrating a third example of execution of the read instruction in the embodiment of the present technology.

FIG. 18 is a timing chart illustrating a third example of execution of the read instruction in the embodiment of the present technology. This exemplary case is made assuming that a fill process and a write-back process are performed in preceding access, and following access after the fill process is completed is suspended.

It is assumed that the processor #1 issues a read instruction (731), and the tag control section 230 of the secondary cache 200 makes determination of mishit and dirty (732). At this time, the response section 260 of the secondary cache 200 issues instructions of fill and write-back of a cache line to the main memory 300 (733). Consequently, each of ROS and WOS becomes 1 in a corresponding cache index. Although the instructions of fill and write-back processes are issued at the same time, which process is completed first is varied depending on an external state of the secondary cache 200. Here, the fill process is assumed to be completed first (736). When the fill process is completed, the ROS becomes "0", but the WOS is still "1".

After completion of the fill process, the processor #2 issues a read instruction to the same cache index (734), and the tag control section 230 of the secondary cache 200 detects ROS=0 and WOS=1. Consequently, a read process based on the read instruction from the processor #2 is suspended (735).

Subsequently, when the write-back process is completed (737), each of ROS and WOS becomes 0 in a corresponding cache index, and read operation from the secondary cache 200 is performed with regard to the read instruction from the processor #1 (738). In addition, read operation from the secondary cache 200 is also performed with regard to the read instruction from the processor #2 (739).

Figure 19:
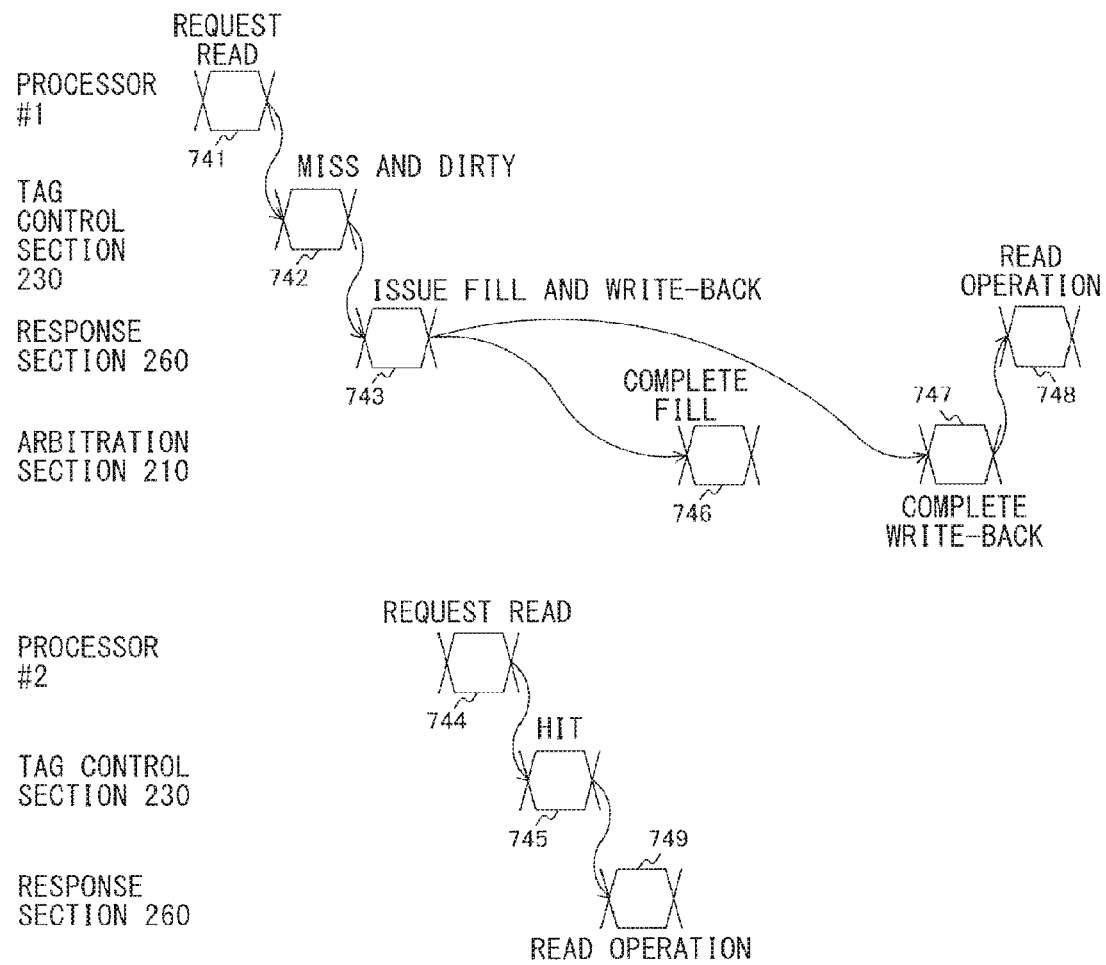
FIG. 19 is a timing chart illustrating a fourth example of execution of the read instruction in the embodiment of the present technology.

FIG. 19 is a timing chart illustrating a fourth example of execution of the read instruction in the embodiment of the present technology. This exemplary case is made assuming that index addresses are different between preceding access and following access.

It is assumed that the processor #1 issues a read instruction (741), and the tag control section 230 of the secondary cache 200 makes determination of mishit and dirty (742). At this time, the response section 260 of the secondary cache 200 issues instructions of fill and write-back of a cache line to the main memory 300 (743). Consequently, each of ROS and WOS becomes 1 in a corresponding cache index.

On the other hand, while the processor #2 issues a read instruction (744), a cache index to be accessed is assumed to be different. In this case, the tag control section 230 of the secondary cache 200 detects ROS=0 and WOS=0 in that cache index. When the tag control section 230 detects cache hit (745), and read operation from the secondary cache 200 is performed with regard to the read instruction from the processor #2 (749).

When both the fill and write-back processes based on the read instruction from the processor #1 are completed (746 and 747), each of ROS and WOS becomes 0 in a corresponding cache index. Consequently, read operation from the secondary cache 200 is performed with regard to the read instruction from the processor #1 (748).

Figure 20:
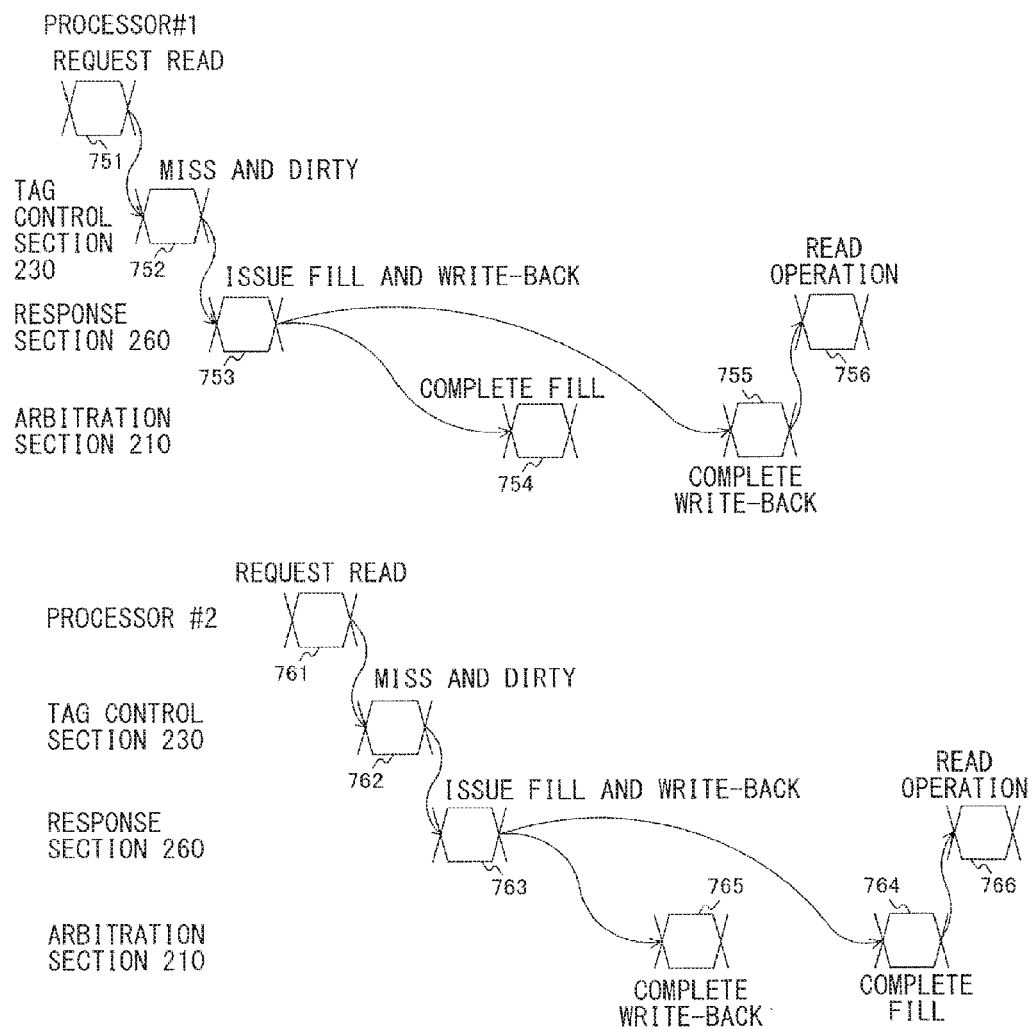
FIG. 20 is a timing chart illustrating a fifth example of execution of the read instruction in the embodiment of the present technology.

FIG. 20 is a timing chart illustrating a fifth example of execution of the read instruction in the embodiment of the present technology. This exemplary case is made assuming that index addresses are different between preceding access and following access, and a fill process and a write-back process are performed in each access operation.

It is assumed that the processor #1 issues a read instruction (751), and the tag control section 230 of the secondary cache 200 makes determination of mishit and dirty (752). At this time, the response section 260 of the secondary cache 200 issues instructions of fill and write-back of a cache line to the main memory 300 (753). Consequently, each of ROS and WOS becomes 1 in a corresponding cache index.

On the other hand, while the processor #2 issues a read instruction (761), a cache index to be accessed is assumed to be different. In this case, the tag control section 230 of the secondary cache 200 detects ROS=0 and WOS=0 in that cache index. The tag control section 230 is assumed to make determination of mishit and dirty (762). At this time, the response section 260 of the secondary cache 200 issues instructions of fill and write-back of a cache line to the main memory 300 (763). Consequently, each of ROS and WOS becomes 1 in a corresponding cache index.

Thus, when the index addresses are different between the preceding access and the following access, instructions of fill and write-back may be issued for both access operations. In this case, which process is completed first between the fill and write-back processes is also varied depending on an external state of the secondary cache 200. In this example, with the read instruction from the processor #1, the fill process is completed first (754), and then the write-back process is completed (755). Consequently, each of ROS and WOS becomes 0 in a corresponding cache index, and read operation from the secondary cache 200 is performed with regard to the read instruction from the processor #1 (756). On the other hand, in this example, with the read instruction from the processor #2, the write-back process is completed first (765), and then the fill process is completed (764). Consequently, each of ROS and WOS becomes 0 in a corresponding cache index, and read operation from the secondary cache 200 is performed with regard to the read instruction from the processor #2 (766).

Thus, according to the embodiment of the present technology, the read outstanding 225 and the write outstanding 226 are provided in each cache index, thereby access suspension is allowed to be achieved in the secondary cache 200 in a simple configuration. Specifically, whether access is suspended or not is allowed to be determined in a stage prior to performing tag comparison or processing on a state of valid or dirty, and consequently complicated processing is allowed to be avoided. In a typical cache memory circuit, a part, which determines operation based on read information from the tag storage section, is a most difficult portion for guarantee of operation timing. In the embodiment of the present technology, the circuit is simplified; hence, even if a complicated operation such as miss under miss is performed, timing matching is easily made during circuit synthesis.

[2. Modification]

Although the read outstanding 225 and the write outstanding 226 are individually provided in each cache index in the above-described embodiment, they may be collectively provided. As a result, suspension caused by a read process is difficult to be distinguished from suspension caused by a write process, but a hardware configuration and control thereof are more simplified. It is to be noted that since a basic configuration is similar to that in the above-described embodiment, detailed description thereon is omitted.

[Configuration of Tag Storage Section]

Figure 21:
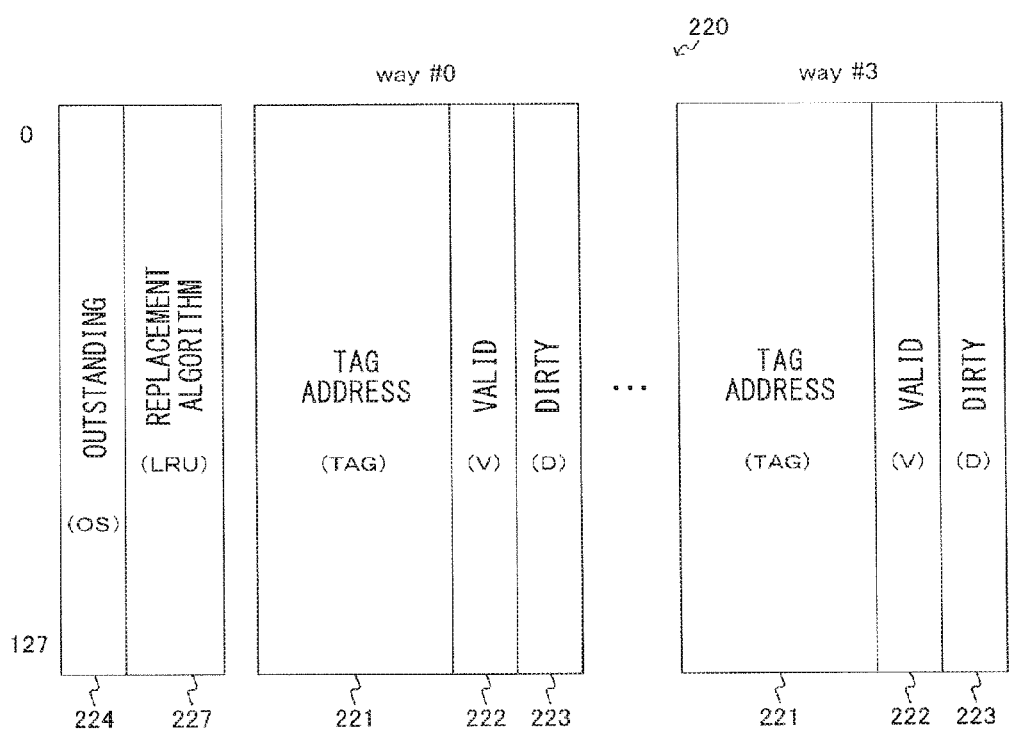
FIG. 21 is a diagram illustrating a configuration example of a tag storage section 220 in a modification of the embodiment of the present technology.

FIG. 21 is a diagram illustrating a configuration example of a tag storage section 220 according to a modification of the embodiment of the present technology. The tag storage section 220 is similar to the tag storage section 220 in the above-described embodiment in that fields of a tag address 221, valid 222, and dirty 223 are provided in each of the cache lines in four ways. In this modification, fields of an outstanding 224 and a replacement algorithm 227 are provided in each index. The replacement algorithm 227 is similar to that in the above-described embodiment.

The outstanding 224 stores an outstanding bit (Outstanding) indicating that one of the cache lines corresponding to that index is in a wait state of read or write from/into the main memory 300. If the outstanding 224 indicates "1", the wait state of read or write from/into the main memory 300 occurs in one of the cache lines corresponding to that index. On the other hand, if the outstanding 224 indicates "0", the wait state of read or write from/into the main memory 300 does not occur in any of the cache lines corresponding to that index. In the drawing, the outstanding 224 is abbreviated as "OS". It is to be noted that the outstanding 224 corresponds to an example of the suspension-indicating section according to the appended claims.

The outstanding 224 in this modification is considered to be the logical sum (OR) of the read outstanding 225 and the write outstanding 226 in the above-described embodiment. Hence, when an instruction of a fill or write-back process of a cache line is issued, the outstanding 224 is set to 1 (OS=1). Subsequently, when the fill process and the write-back process are completed, and when all wait states of read or write for that cache line are eliminated, the outstanding 224 is cleared to be 0 (OS=0).

[Operation of Secondary Cache]

Figure 22:
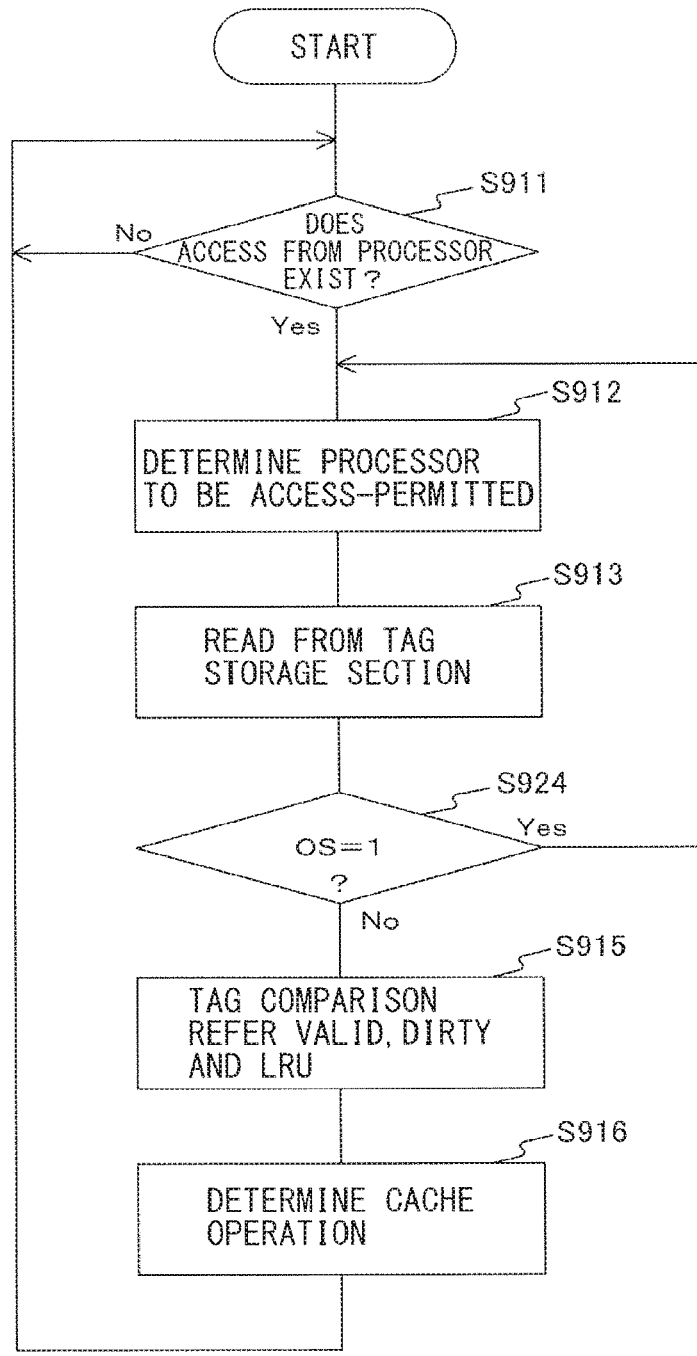
FIG. 22 is a flowchart illustrating a processing procedure example of a secondary cache 200 in the modification of the embodiment of the present technology.

FIG. 22 is a flowchart illustrating a processing procedure example of the secondary cache 200 of the modification of the embodiment of the present technology. Although the process is advanced to subsequent processing on condition that both the read outstanding bit 225 and the write outstanding bit 226 indicate "0" in step S914 in the above-described embodiment, only the outstanding 224 is referred in this modification. Specifically, if the outstanding 224 is "1", the access is suspended (step S924: Yes). If the outstanding 224 is "0", tag comparison, etc. is performed (step S924: No).

Thus, according to the modification of the embodiment of the present technology, hardware configuration and control thereof are more simplified.

It is to be noted that the above-described embodiment shows an example embodiment of the present technology. Each of the subjects in the above-described embodiment has a correspondence relationship with each of the subjects specified by the technology in the appended claims. Similarly, each of the matters specifying the claimed invention has a correspondence relationship with each of the subjects with designations identical thereto in the above-described embodiment of the present technology. However, the technology is not limited to the above-described embodiment, and is allowed to be embodied through various modifications or alterations of such embodiment within the scope without departing from the spirit of the technology.

It is possible to achieve at least the following configurations from the above-described example embodiments of the disclosure.

(1) A cache memory, including:

a tag storage section in which one of a plurality of indexes, each index containing a plurality of tag addresses and one suspension-indicating section, is looked up by a first address portion of an accessed address;

a data storage section configured to store each of data corresponding to the plurality of tag addresses for each of the plurality of indexes:

a tag control section configured to, when the suspension-indicating section contained in the looked-up index indicates suspension, allow access relevant to the accessed address to wait, and when the suspension-indicating section contained in the looked-up index indicates non-suspension, compare a second address portion different from the first address portion of the accessed address to each of the plurality of tag addresses contained in the looked-up index, and detects a tag address matched with the second address portion; and a data control section configured to, when the suspension-indicating section contained in the looked-up index indicates non-suspension, select, from the data storage section, data corresponding to the tag address matched with the second address portion among the plurality of tag addresses contained in the looked-up index.

(2) The cache memory according to (1), wherein the suspension-indicating section includes a read-induced suspension-indicating section configured to indicate suspension induced by a read process, and a write-induced suspension-indicating section configured to indicate suspension induced by a write process, and when one or both of the read-induced suspension-indicating section and the write-induced suspension-indicating section indicates suspension in the looked-up index, the tag control section allows the access relevant to the accessed address to wait.

(3) The cache memory according (1) or (2), wherein
the cache memory is a common cache memory shared by a plurality of masters.

(4) A cache memory control unit, including:
a tag storage section in which one of a plurality of indexes, each index containing a plurality of tag addresses and one suspension-indicating section, is looked up by a first address portion of an accessed address; and
a tag control section configured to, when the suspension-indicating section contained in the looked-up index indicates suspension, allow access relevant to the accessed address to wait, and when the suspension-indicating section contained in the looked-up index indicates non-suspension, compare a second address portion different from the first address portion of the accessed address to each of the plurality of tag addresses contained in the looked-up index, and detects a tag address matched with the second address portion.

(5) A method of controlling a cache memory that includes a tag storage section in which one of a plurality of indexes, each index containing a plurality of tag addresses and one suspension-indicating section, is looked up by a first address portion of an accessed address, the method including:
when the suspension-indicating section contained in the looked-up index indicates suspension, allowing access relevant to the accessed address to wait; and
when the suspension-indicating section contained in the looked-up index indicates non-suspension, comparing a second address portion different from the first address portion of the accessed address to each of the plurality of tag addresses contained in the looked-up index, and detecting a tag address matched with the second address portion.

It should be understood by those skilled in the art that various modifications, combinations, sub-combinations and alterations may occur depending on design requirements and other factors insofar as they are within the scope of the appended claims or the equivalents thereof.

What is claimed is:

1. A memory system, comprising:
at least one processor;
a cache configured to connect to the at least one processor; and
at least one memory configured to connect to the cache;
wherein the cache includes a plurality of entries, the cache configured to:
store data corresponding to a plurality of tag addresses for each index of a plurality of indexes to each entry of the plurality of entries;
compare a first tag address of the plurality of tag addresses associated with a first entry of the plurality of entries and a second tag address obtained from an accessed address based on a value of a determined bit that indicates whether access to the data is permitted, wherein the accessed address is supplied from the at least one processor or the at least one memory;
select an entry of the plurality of entries based on the comparison; and
access the data stored in the selected entry.

2. The memory system according to claim 1, wherein the cache further includes an arbitration section, wherein the arbitration section is configured to arbitrate access from the at least one processor or the at least one memory.

3. The memory system according to claim 1, wherein the cache further includes a tag storage section, wherein the tag storage section is configured to hold the plurality of tag addresses in each entry of the plurality of entries.

4. The memory system according to claim 3, wherein the cache further includes a tag control section, wherein the tag control section is configured to select the entry of the plurality of entries to be accessed in the tag storage section based on the accessed address.

5. The memory system according to claim 3, wherein the cache further includes a data storage section, wherein the data storage section is configured to store the data corresponding to each entry of the tag storage section.

6. The memory system according to claim 5, wherein the cache further includes a data control section, wherein the data control section is configured to access the data stored in the data storage section based on the selected entry.

7. The memory system according to claim 5, wherein the data storage section is further configured to store the data corresponding to the plurality of tag addresses for each index of the plurality of indexes.

8. The memory system according to claim 3, wherein the tag storage section is further configured to hold fields of a tag address, a valid bit, and a dirty bit in each of a plurality of cache lines.

9. The memory system according to claim 3, wherein at least one of the plurality of indexes of the tag storage section is looked up by a first address portion of the accessed address, and wherein each index contains the plurality of tag addresses and a suspension-indicating section.

10. The memory system according to claim 9, wherein the cache further includes a tag control section, wherein the tag control section is configured to, based on the suspension-indicating section contained in a looked-up index that indicates suspension, allow access to the accessed address to wait, and based on the suspension-indicating section contained in the looked-up index that indicates non-suspension, compare a second address portion different from the first address portion of the accessed address to each of the plurality of tag addresses contained in the looked-up index, and detect a tag address matched with the second address portion.

11. The memory system according to claim 10, wherein the tag control section is further configured to determine that the access to the accessed address is to be suspended based on the suspension indicating section, before processing on a state of a valid bit or a dirty bit included in the detected tag address.

12. The memory system according to claim 10, wherein the cache further includes a data control section, wherein the data control section is configured to, based on the suspension-indicating section contained in the looked-up index that indicates the non-suspension, select the data corresponding to the tag address matched with the second address portion among the plurality of tag addresses contained in the looked-up index.

13. The memory system according to claim 12, wherein the suspension-indicating section includes a read-induced suspension-indicating section configured to indicate suspension induced by a read process, and a write-induced suspension-indicating section configured to indicate the suspension induced by a write process, and based on one or both of the read-induced suspension-indicating section and the write-induced suspension-indicating section that indicates the suspension in the looked-up index, the tag control section is further configured to allow the access to the accessed address to wait until one or both of the read-induced suspension-indicating section and the write-induced suspension-indicating section indicate the non-suspension.

14. The memory system according to claim 12, wherein the cache shared by a plurality of masters, wherein each of the plurality of masters comprises the at least one processor.

15. The memory system according to claim 1, wherein the value of the determined bit is determined prior to the comparison of the first tag address of the plurality of tag addresses associated with the first entry and the second tag address obtained from the accessed address.

* * * * *